United States Patent
Ho et al.

(10) Patent No.: US 8,605,061 B2
(45) Date of Patent: *Dec. 10, 2013

(54) TOUCH PANEL INPUT STYLUS

(75) Inventors: Hung-Lung Ho, Taipei Hsien (TW); Ho-Chiang Liu, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 523 days.

This patent is subject to a terminal disclaimer.

(21) Appl. No.: 12/888,383

(22) Filed: Sep. 22, 2010

(65) Prior Publication Data

US 2011/0134084 A1    Jun. 9, 2011

(30) Foreign Application Priority Data

Dec. 7, 2009 (CN) .......................... 2009 1 0311017

(51) Int. Cl.
*G06F 3/033* (2013.01)
*G06K 11/06* (2006.01)
*G06F 3/041* (2006.01)
*G08C 21/00* (2006.01)

(52) U.S. Cl.
USPC ........................................ 345/179; 178/19.01

(58) Field of Classification Search
USPC .............................. 345/179; 178/19.01–19.07
See application file for complete search history.

(56) References Cited

U.S. PATENT DOCUMENTS

| | | | | |
|---|---|---|---|---|
| 4,355,915 A | * | 10/1982 | Kaji et al. ...................... | 401/216 |
| 5,369,262 A | * | 11/1994 | Dvorkis et al. ............... | 345/179 |
| 5,845,982 A | * | 12/1998 | Shih ............................... | 353/42 |
| 2011/0090668 A1 | * | 4/2011 | Lin ................................. | 362/84 |

FOREIGN PATENT DOCUMENTS

| | | |
|---|---|---|
| CN | 2626737 Y | 7/2004 |
| CN | 200997120 Y | 12/2007 |

* cited by examiner

*Primary Examiner* — Kent Chang
*Assistant Examiner* — Nathan Brittingham
(74) *Attorney, Agent, or Firm* — Altis Law Group, Inc.

(57) ABSTRACT

A touch panel input stylus comprises a casing, a lens, a shading member, and a light emitting element. The lens, the shading member, and the light emitting element are received in the casing. The shading member defines a stepped through aperture. The stepped through aperture includes a light through hole and a receiving hole having a greater diameter than the light through hole. A longitudinal positioning structure is provided in the receiving hole. The light emitting element is received and fixed in the receiving hole firmly by the longitudinal positioning structure. The longitudinal positioning structure is deformable. The light emitted from the light emitting element passes through the light through hole and then travels through the lens.

1 Claim, 2 Drawing Sheets

TOUCH PANEL INPUT STYLUS

BACKGROUND

1. Technical Field

The present disclosure generally relates to touch panel input styluses, and particularly to a touch panel input stylus projecting a light beam.

2. Description of the Related Art

When using information processors such as a personal computer, a word processor, or various other portable electronic devices, a keyboard or mouse are commonly used to input information. On the other hand, there are touch panel displays (hereinafter also referred to as "a touch panel"), which can be used as well for the same operations.

An input stylus is used as input means for inputting information to the touch panel. In the case of an optical sensitive type touch panel, there is an input stylus for outputting a light beam from a stylus tip. Information on a position input by the input stylus with respect to the screen of the touch panel is detected by detecting the light beam.

When using this type of stylus, if the light beam is not exactly the same as the input central axis, there can be inefficiencies with the input instructions.

What is needed, therefore, is a touch panel input stylus which can avoid imprecision of the position of the light beam, and ameliorate the described limitations.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the touch panel input pen. Moreover, in the drawings, like reference numerals designate corresponding parts throughout the views.

DETAILED DESCRIPTION

Embodiments of a touch panel input stylus as disclosed are described in detail here with reference to the drawings.

Figure 1:
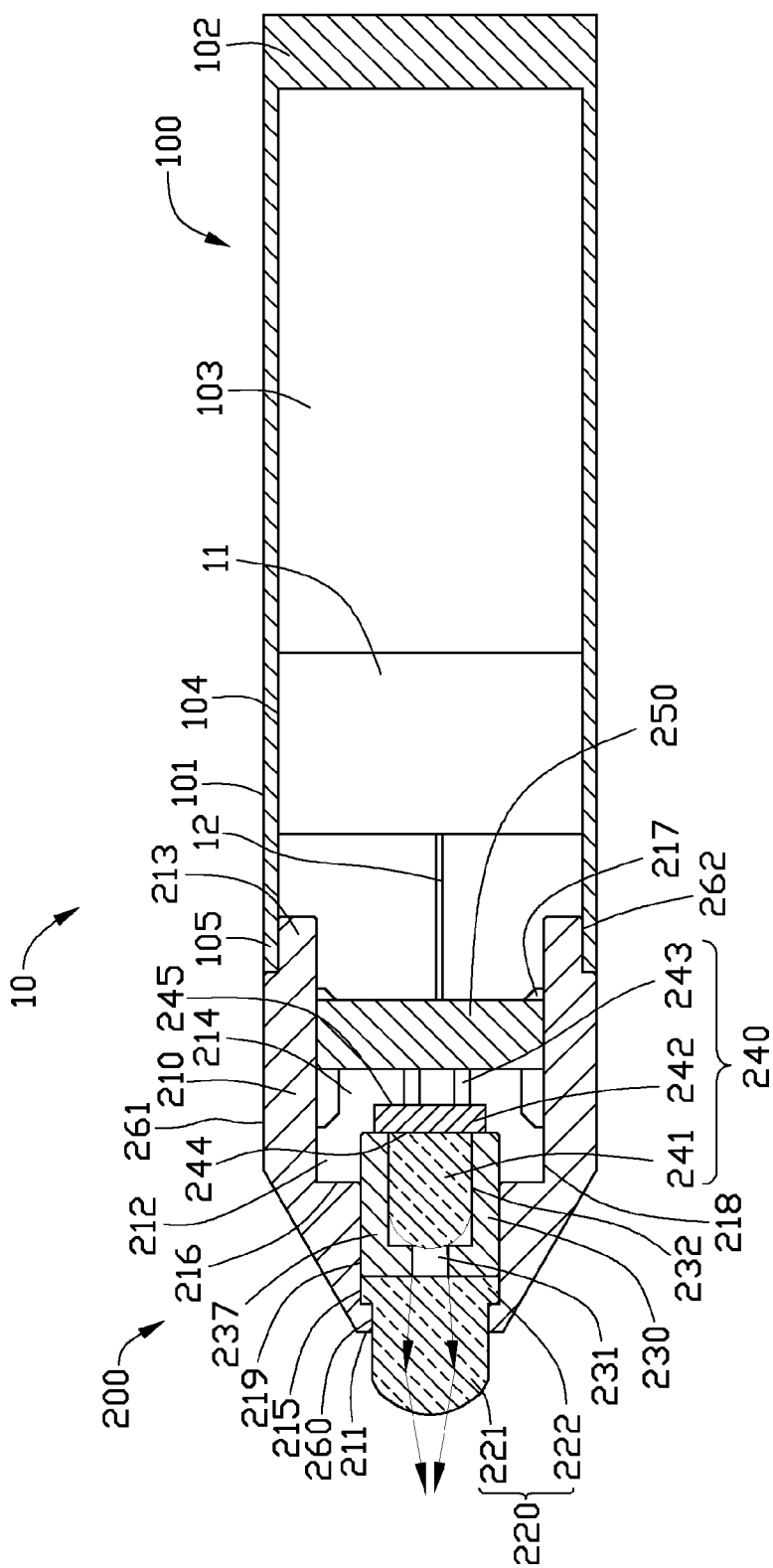
FIG. 1 is a cross-sectional view of a touch panel input stylus in accordance with an exemplary embodiment.

Referring to FIG. 1, a touch panel input stylus 10 in accordance with a first embodiment includes a stylus holder 100, and a stylus tip 200. The stylus holder 100 is cylindrical and includes a blind hole 103 arranged longitudinally inside the stylus holder 100. The stylus holder 100 defines a longitudinal open front end 101 and a longitudinal closed rear end 102. The inner wall 104 of the blind hole 103 near the longitudinal open front end 101 forms a thread portion 105. A power supply element 11 is provided inside the blind hole 103 of the stylus holder 100. The power supply element 11 is a battery in this embodiment.

The stylus tip 200 includes a casing 210, a lens 220, a shading member 230, a light emitting element 240, and a circuit board 250. The light emitting element 240 according to the preferred embodiment is a light emitting diode (LED). In addition, the light emitting element 240 can also be an organic light emitting diode or a laser diode. The lens 220, the shading member 230, the light emitting element 240, and the circuit board 250 are received in the casing 210. A stepped receiving chamber 212 is defined longitudinally passing through the inside of the casing 210. A first open end 211 and a second open end 213 are defined respectively at each of the two ends of the casing 210. The first open end 211 is the tip of the touch panel input stylus 10, and the second open end 213 connects to the longitudinal open front end 101 of the stylus holder 100.

The receiving chamber 212 includes a large cavity 214 near the second open end 213 and a small cavity 215 near the first open end 211; the connecting portion of the large cavity 214 and the small cavity 215 forms a stage 216. The inner wall 218 of the large cavity 214 forms a ring protrusion 217 protruding inwardly along the longitudinal direction. A sliding groove is arranged on the ring protrusion 217 along the longitudinal direction. The inner wall 219 of the small cavity 215 beside the first open end 211 forms a ring flange 260 protruding inwardly along the longitudinal direction. The outer wall 261 of the casing 210 on the second open end 213 forms a thread portion 262.

The lens 220 includes an optical portion 221 and a fixing portion 222 protruding out from the optical portion 221 at the end near the light emitting element 240 along the longitudinal direction. The outer diameter of the fixing portion 222 is the same as the diameter of the small cavity 215 of the casing 210. The shading member 230 abuts the fixing portion 222 and the fixing portion 222 abuts the ring flange 260 of the inner wall 219 of the small cavity 215. The optical portion 221 penetrates out of the first open end 211.

Figure 2:
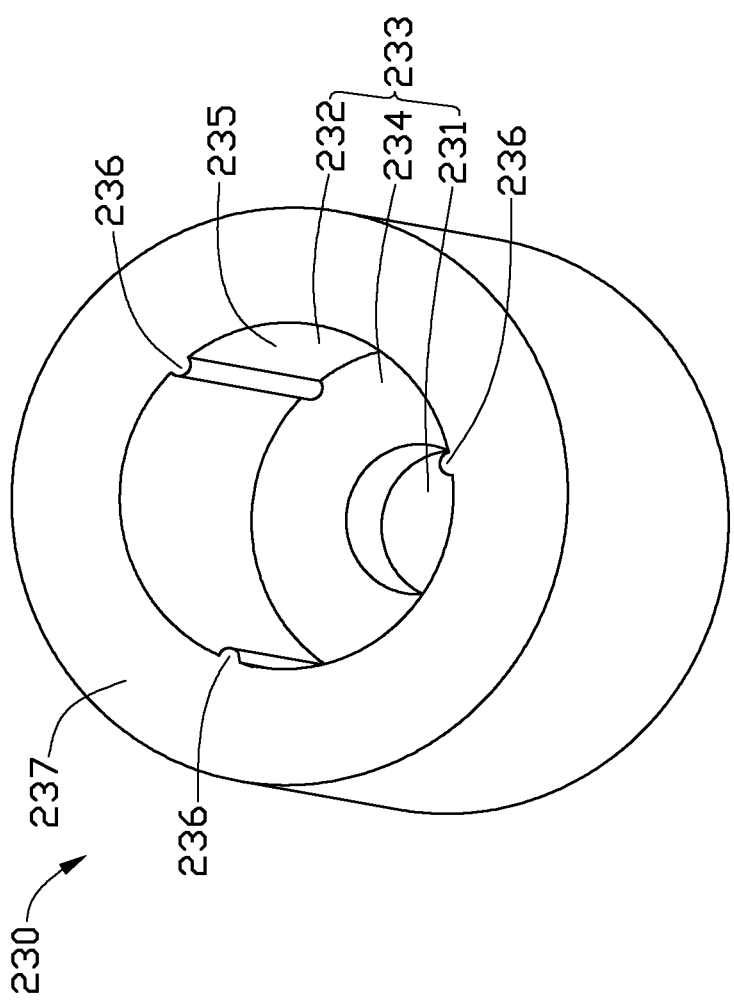
FIG. 2 is a perspective view of a shading member of the touch panel input stylus of FIG. 1.

Referring to FIG. 2, the shading member 230 is cylindrical and the outer diameter of the shading member 230 is the same with the diameter of the small cavity 215 of the casing 210. The shading member 230 is made from opaque material and defines a stepped through aperture 233 along the longitudinal direction. The stepped through aperture 233 includes a light through hole 231 and a receiving hole 232 having a greater diameter than the light through hole 231. The light through hole 231 is at the front end of the shading member 230, the receiving hole 232 is at the rear end of the shading member 230, and the connecting portion of the light through hole 231 and the receiving hole 232 forms a stage 234.

A longitudinal positioning structure is provided on the inner wall 235 of the receiving hole 232. The light axis of the light emitting element 240 and the central axis of the shading member 230 are made the same by the longitudinal positioning structure. In this embodiment, the longitudinal positioning structure includes three elastic and deformable ribs 236 arranged symmetrically along the longitudinal direction on the inner wall 235 of the receiving hole 232.

The light emitting element 240 includes a light emitting body 241, a base 242, and two pins 243. The outer diameter of the base 242 exceeds the diameter of the receiving hole 232 of the shading member 230. The base 242 includes a first surface 244 and a second surface 245 opposite to the first surface 244. The light emitting body 241 is on the first surface 244 and the pins 243 extend rearward from the second surface 245 to electrically connect with the circuit board 250.

The lens 220 is received in the receiving chamber 212 of the casing 210. The optical portion 221 of the lens 220 extends out from the first open end 211 of the casing 210. The fixing portion 222 of the lens 220 is received in the small cavity 215 of the receiving chamber 212 of the casing 210 and abuts on the ring flange 260 along the longitudinal direction. The shading member 230 is inserted into the small cavity 215 of the receiving chamber 212 of the casing 210 and abuts on the base 242 of the light emitting element 240 along the longitudinal direction. The light through hole 231 of the shading member 230 faces the lens 220. The fixing portion 222 of the lens 220 and the shading member 230 are both received in the small cavity 215 of the receiving chamber 212 of the casing 210, and the outer diameter of the fixing portion 222 and the shading member 230 are both the same as the diameter of the small cavity 215. The central axes of the lens 220 and the shading member 230 are also the same.

The light emitting body 241 of the light emitting element 240 is inserted into the shading member 230 from the side of the receiving hole 232, and the base 242 of the light emitting element 240 abuts on a longitudinal end 237 of the shading member 230 near the receiving hole 232. The light emitting body 241 of the light emitting element 240 firmly contacts with the three ribs 236 of the receiving hole 232 of the shading member 230. The ribs 236 can be deformed when it is subjected to a radially outward pressing force acting thereon, which is derived from the light emitting body 241 when it is inserted into the receiving hole 232.

The circuit board 250 is inserted into the sliding groove of the ring protrusion 217 along the longitudinal direction to be received in the large cavity 214 of the casing 210. The second open end 213 of the casing 210 faces the longitudinal open front end 101 of the stylus holder 100, and the thread portion 262 of the casing 210 screw with the thread portion 105 of the stylus holder 100. The pins 243 of the light emitting element 240 electrically connect with the circuit board 250, and the circuit board 250 electrically connects with the power supply element 11 with a wire 12.

The central axes of the lens 220 and the shading member 230 and the optical axis of the light emitting element 240 are the same. The light emitted from the light emitting element 240 passes through the light through hole 231 and then travels through the lens 220 out of the casing 210 to make a precision light spot for signal input.

It is to be understood, however, that even though numerous characteristics and advantages of the disclosure have been set forth in the foregoing description, together with details of the structures and functions of the embodiment(s), the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A touch panel input stylus comprising a casing, a lens, a shading member, and a light emitting element, the lens, the shading member and the light emitting element received in the casing, wherein the shading member is arranged with a stepped through aperture including a light through hole and a receiving hole with a greater diameter than the light through hole, a longitudinal positioning structure is arranged on the inner wall of the receiving hole with the light emitting element firmly fixed inside the receiving hole and the light from the light emitting element passes the light through hole to the lens, the casing comprising an open end and a small cavity near the open end, an inner wall of the small cavity beside the open end forming a ring flange protruding inwardly along a longitudinal direction, and the lens abutting the ring flange and penetrating out of the opening end, the lens comprising an optical portion and a fixing portion protruding out from the optical portion, the shading member abutting the fixing portion and the fixing portion directly abutting the ring flange of the inner wall of the small cavity, and the optical portion penetrating out of the first open end.

* * * * *